United States Patent
Postic et al.

(10) Patent No.: US 11,255,998 B2
(45) Date of Patent: Feb. 22, 2022

(54) CATHEDRAL BODY STRUCTURE FOR AN OCEAN BOTTOM SEISMIC NODE

(71) Applicant: Seabed Geosolutions B.V., Leidschendam (NL)

(72) Inventors: Erwan Francois Marie Postic, Houston, TX (US); Thierry Brizard, Ollainville (FR)

(73) Assignee: Seabed Geosolutions B.V., Leidschendam (NL)

( * ) Notice: Subject to any disclaimer, the term of this patent is extended or adjusted under 35 U.S.C. 154(b) by 304 days.

(21) Appl. No.: 16/413,079

(22) Filed: May 15, 2019

(65) Prior Publication Data

US 2019/0353815 A1    Nov. 21, 2019

Related U.S. Application Data

(60) Provisional application No. 62/673,050, filed on May 17, 2018.

(51) Int. Cl.
*G01V 1/38* (2006.01)
*B63G 8/00* (2006.01)
(Continued)

(52) U.S. Cl.
CPC .............. *G01V 1/3852* (2013.01); *B63B 3/26* (2013.01); *B63G 8/001* (2013.01);
(Continued)

(58) Field of Classification Search
CPC ................. G01V 1/3852; B63G 8/001; B63G 2008/002; B63G 2008/004; B63B 3/26
See application file for complete search history.

(56) References Cited

U.S. PATENT DOCUMENTS

| 3,256,849 A | 6/1966 | Lehmann |
| 3,492,965 A | 2/1970 | Wayfield |

(Continued)

FOREIGN PATENT DOCUMENTS

| CN | 102213594 A | 10/2011 |
| EP | 1217390 A1 | 6/2002 |

(Continued)

OTHER PUBLICATIONS

Petition for Inter Partes Review of U.S. Pat. No. Re. 45,268, dated Apr. 27, 2018.

(Continued)

*Primary Examiner* — Ian J Lobo
(74) *Attorney, Agent, or Firm* — Park, Vaughan, Fleming & Dowler LLP; Shane Nelson

(57) ABSTRACT

Disclosed is an ocean bottom seismic node for recording seismic signals on the seabed. The ocean bottom seismic node may comprise an arched cathedral buoyant body coupled to a substantially flat bottom metal plate. The buoyant body may be formed of hard plastic (such as plastic injection in a mold) and have one or more cathedral type inner structures with columns that form a plurality of interconnected inner chambers, which may be dry or filled with foam and/or act as ballasts. One or more electronic components may be directly attached to the bottom metal plate (and within one or more of the internal cathedral chambers) and covered/protected by the buoyant body that is water and pressure resistant at seabed depths. The edge(s) of the buoyant body may seal around the metal plate on one or more peripheral edges of the plate and buoyant body.

18 Claims, 6 Drawing Sheets

(51) Int. Cl.
 *B63B 3/26* (2006.01)
 *G01V 1/18* (2006.01)

(52) U.S. Cl.
 CPC ........ *B63G 2008/002* (2013.01); *G01V 1/181* (2013.01); *G01V 1/3826* (2013.01)

(56) References Cited

U.S. PATENT DOCUMENTS

| | | | |
|---|---|---|---|
| 5,253,605 | A | 10/1993 | Collins |
| 5,758,592 | A | 6/1998 | Benson, Jr. |
| 5,894,450 | A | 4/1999 | Schmidt et al. |
| 6,230,840 | B1 | 5/2001 | Ambs |
| 6,390,012 | B1 | 5/2002 | Watt et al. |
| 6,474,254 | B1 | 11/2002 | Ambs et al. |
| 6,482,054 | B2 | 11/2002 | Treaster et al. |
| 6,625,083 | B2 | 9/2003 | Vandenbroucke |
| 6,640,740 | B1 | 11/2003 | French et al. |
| 6,779,475 | B1 | 8/2004 | Crane et al. |
| 6,829,197 | B2 | 12/2004 | Erikson |
| 6,932,185 | B2 | 8/2005 | Bary et al. |
| 6,951,138 | B1 | 10/2005 | Jones |
| 7,016,260 | B2 | 3/2006 | Bary |
| 7,124,698 | B1 | 10/2006 | Shen et al. |
| 7,148,416 | B1 | 12/2006 | Rice |
| 7,183,742 | B2 | 2/2007 | Potter et al. |
| 7,252,046 | B1 | 8/2007 | Ead et al. |
| 7,796,466 | B2 | 9/2010 | Combee et al. |
| 7,965,583 | B2 | 6/2011 | Thomas |
| 8,025,021 | B2 | 9/2011 | Gosling |
| 8,096,254 | B1 | 1/2012 | Bauer et al. |
| 8,109,223 | B2 | 2/2012 | Jamieson |
| 8,576,658 | B2 | 11/2013 | Thomas |
| 8,677,921 | B2 | 3/2014 | Gosling |
| 8,717,844 | B2 | 5/2014 | Welker et al. |
| 9,052,380 | B2 | 6/2015 | Winter et al. |
| 9,090,319 | B2 | 7/2015 | Brizard et al. |
| 9,174,713 | B2 | 11/2015 | Item et al. |
| 9,381,986 | B2 | 7/2016 | Brizard |
| 9,457,879 | B2 | 10/2016 | Brizard |
| 9,778,386 | B2 | 10/2017 | Naes et al. |
| 9,829,589 | B2 | 11/2017 | Ray et al. |
| 2003/0164134 | A1 | 9/2003 | King |
| 2005/0270901 | A1* | 12/2005 | Swanson ............... G01V 1/201 367/15 |
| 2007/0051292 | A1 | 3/2007 | Kilbourn et al. |
| 2010/0000459 | A1 | 1/2010 | Colangelo |
| 2010/0157727 | A1 | 6/2010 | Woodward, Jr. et al. |
| 2010/0182870 | A1 | 7/2010 | Norris et al. |
| 2010/0302901 | A1 | 12/2010 | Welker et al. |
| 2011/0297121 | A1 | 12/2011 | Kraus et al. |
| 2012/0020185 | A1 | 1/2012 | Welker et al. |
| 2012/0057430 | A1 | 3/2012 | Rouquette et al. |
| 2012/0069702 | A1 | 3/2012 | Muyzert et al. |
| 2012/0210836 | A1 | 8/2012 | Wiggins et al. |
| 2012/0289103 | A1 | 11/2012 | Hudson et al. |
| 2014/0053768 | A1* | 2/2014 | Brizard ............... G01V 1/3843 114/321 |
| 2014/0078861 | A1 | 3/2014 | Tamanaja |
| 2014/0140170 | A1 | 5/2014 | Brizard |
| 2014/0230714 | A1 | 8/2014 | Sylvia et al. |
| 2014/0251199 | A1 | 9/2014 | Brizard |
| 2014/0259618 | A1 | 9/2014 | Damus et al. |
| 2014/0290554 | A1 | 10/2014 | Brizard |
| 2014/0301161 | A1 | 10/2014 | Brizard et al. |
| 2015/0136012 | A1 | 5/2015 | Williams |
| 2015/0210359 | A1 | 7/2015 | McClure |
| 2015/0331126 | A1 | 11/2015 | Lambert et al. |
| 2015/0336645 | A1 | 11/2015 | Brizard et al. |
| 2016/0124105 | A1 | 5/2016 | Valsvik et al. |
| 2017/0137098 | A1 | 5/2017 | Valsvik et al. |
| 2018/0222560 | A1 | 8/2018 | Postic et al. |

FOREIGN PATENT DOCUMENTS

| | | |
|---|---|---|
| EP | 1319964 A2 | 11/2002 |
| GB | 2041301 A | 9/1980 |
| GB | 2163114 A | 2/1986 |
| WO | 200173477 A2 | 10/2001 |
| WO | 2007045887 A2 | 4/2007 |
| WO | 2009039488 A1 | 3/2009 |
| WO | 2011106237 A2 | 9/2011 |
| WO | 2012013171 A1 | 2/2012 |
| WO | 2012013962 A1 | 2/2012 |
| WO | 2012085590 A2 | 6/2012 |
| WO | 2013041838 A2 | 3/2013 |
| WO | 2013045669 A1 | 4/2013 |
| WO | 2013076488 A1 | 5/2013 |
| WO | 2013128187 A1 | 9/2013 |
| WO | 2013128188 A1 | 9/2013 |
| WO | 2014096265 A2 | 6/2014 |
| WO | 2014122204 A1 | 8/2014 |
| WO | 2017025738 A1 | 2/2017 |
| WO | 2017064503 A1 | 4/2017 |
| WO | 2017064504 A1 | 4/2017 |
| WO | 2017064505 A1 | 4/2017 |

OTHER PUBLICATIONS

Petition for Inter Partes Review of U.S. Pat. No. 8,228,761, dated Apr. 27, 2018.
Petition for Inter Partes Review of U.S. Pat. No. 8,879,362, dated Apr. 27, 2018.
International Search Report in corresponding International Application No. PCT/EP2012/069144, dated Feb. 4, 2013.
Written Opinion in corresponding International Application No. PCT/EP2012/069144, dated Feb. 4, 2013.
International Search Report in corresponding International Application No. PCT/EP2012/069145, dated Feb. 6, 2013.
Written Opinion in corresponding International Application No. PCT/EP2012/069145, dated Feb. 6, 2013.
European Search Report, Ref. PP01726 MP/VR—Application No. 16193961.6-1754, European Patent Office, Germany dated Mar. 15, 2017.
http://www.carrack.co.uk/minidobs.htm ("Carrack"), Carrack Measurement Technology, downloaded Jun. 20, 2017.
Cranford et al; "A Direct-Recording Ocean-Bottom Seismograph", Bulletin of the Seismological Society of America, vol. 66, No. 2, 607-615 (Apr. 1976).
Duey; "Flying Nodes Shift Marine Seismic Paradigm" Dec. 1, 2011, pp. 1-2 [downloaded on Feb. 28, 2012; http://www.epmag.com/item/print/Flying-Nodes-Shift-Marine-Seismic-Paradigm-92689].
Eguchi; A real-time observation network of ocean-bottom-seismometers deployed at the Sagami trough subduction zone, Central Japan, Marine Geophysical Researches 20: 73-94, 1998.
Holloway et al; "The future of deepwater ocean bottom seismic—Are flying nodes the next big step?", SEG New Orleans Annual Meeting 2015, p. 115-119.
Holloway et al; "Using Robotic Flying Nodes for Seabed Seismic Data", WS18 D02, 78th EAGE Conference & Exhibition 2016—Workshop Programme, Vienna, Austria, May 30 Jun. 2, 2016.
Hayakudome; "Design of Autonomous Underwater Vehicle", Japan Agency for Marine-Earth Science and Technology (JAMSTEC), Japan International Journal of Advanced Robotic Systems, vol. 8, No. 1 (2011).
Johnson et al; "A Free-Fall Direct-Recording Ocean Bottom Seismograph", Marine Geophysical Researches 3 103-117 (1977).
Kirk et al; "A Three-Component Ocean Bottom Seismograph for Controlled Source and Earthquake Seismology", Marine Geophysical Researches 5, 1982, 327-341.
Mattaboni et al.; "MITOBS: A Seismometer System for Ocean-Bottom Earthquake Studies", Marine Geophysical Researches 3, (1977), pp. 87-102.
Prothero et al; "First Noise and Teleseismic Recordings on a New Ocean Bottom Seismometer Capsule", Bulletin of the Seismological Society of America, vol. 74, No. 3, 1043-1058 (Jun. 1984).

(56) References Cited

OTHER PUBLICATIONS

Schmalfeldt et al; "Explosion-Generated Seismic Interface Waves in Shallow Water: Experimental Results", Saclantcen Report SR-71 (1983).
Sutton et al; "Optimum Design of Ocean Bottom Seismometers", Marine Geophysical Researches 9, (1987), pp. 47-65.
Willoughby et al; "A Microprocessor-Based Ocean-Bottom Seismometer", Bulletin of the Seismological Society of America, vol. 83, No. 1, 190-217 (Feb. 1993).
Yoerger et al; "Fine-Scale Seafloor Survey in Rugged Deep-Ocean Terrain with an Autonomous Robot", Proceedings ICRA International Conference on Robotics an Automation, San Francisco, CA, Apr. 2000; ISBN 0-7803-5886-4 pp. 1787-1792.
Yoshida et al; "New Attempts in the MR-X1 Sea-Trials—the Working AUV tries to Survey of the Sea Floor and to Take Mud Samples", Paper No. OMAE-2010-20347, Proceedings of the ASME 2010, 29th International Conference on Ocean, Offshore and Arctic Engineering; Jun. 6-11, 2010.

\* cited by examiner

CATHEDRAL BODY STRUCTURE FOR AN OCEAN BOTTOM SEISMIC NODE

PRIORITY

This application claims priority to U.S. provisional patent application No. 62/673,050, filed on May 17, 2018, the entire contents of which is incorporated herein by reference.

BACKGROUND OF THE INVENTION

Field of the Invention

This invention relates to marine seismology and more particularly relates to the design of ocean bottom seismic nodes, and more particularly to the design of autonomous underwater vehicles (AUVs) for recording seismic signals on the ocean bottom.

Description of the Related Art

Marine seismic data acquisition and processing generates a profile (image) of a geophysical structure under the seafloor. Reflection seismology is a method of geophysical exploration to determine the properties of the Earth's subsurface, which is especially helpful in determining an accurate location of oil and gas reservoirs or any targeted features. Marine reflection seismology is based on using a controlled source of energy (typically acoustic energy) that sends the energy through a body of water and subsurface geologic formations. The transmitted acoustic energy propagates downwardly through the subsurface as acoustic waves, also referred to as seismic waves or signals. By measuring the time it takes for the reflections or refractions to come back to seismic receivers (also known as seismic data recorders or nodes), it is possible to evaluate the depth of features causing such reflections. These features may be associated with subterranean hydrocarbon deposits or other geological structures of interest.

There are many methods to record the reflections from a seismic wave off the geological structures present in the surface beneath the seafloor. In one method, a marine vessel tows an array of seismic data recorders provided in streamers. In another method, seismic data recorders are placed directly on the ocean bottom by a variety of mechanisms, including by the use of one or more of Autonomous Underwater Vehicles (AUVs), Remotely Operated Vehicles (ROVs), by dropping or diving from a surface or subsurface vessel, or by attaching autonomous nodes to a cable that is deployed behind a marine vessel. The data recorders may be discrete, autonomous units, with no direct connection to other nodes or to the marine vessel, where data is stored and recorded.

Emerging technologies in marine seismic surveys need a fast and cost-effective system for deploying and recovering seismic receivers that are configured to operate underwater, and in particular ocean bottom seismic nodes. Newer technologies use AUVs that have a propulsion system and are programmed to move to desired positions and record seismic data. In general, the basic structure and operation of a seismic AUV is well known to those of ordinary skill. For example, Applicant's U.S. Pat. No. 9,090,319, incorporated herein by reference, discloses one type of autonomous underwater vehicle for marine seismic surveys. As another example, Applicant's U.S. Patent Publication No. 2017/0137098, incorporated herein by reference, discloses another type of AUV for seabed seismic applications.

Because a seismic survey may require hundreds if not thousands of seismic ocean bottom nodes (OBNs) for a particular survey, an OBN is needed that is easy to operate and relatively straightforward and cost-effective to manufacture. However, existing technologies for deploying an OBN to the ocean bottom (and the related OBN designs) are not cost effective and present many operational problems. An improved OBN is needed that more effectively couples to the seabed. A need exists for an improved OBN that is more cost effective and less complex and one that is easier to maintain and repair.

SUMMARY OF THE INVENTION

Disclosed is an ocean bottom seismic node for recording seismic signals on the seabed. The ocean bottom seismic node may comprise a buoyant body coupled to a substantially flat bottom plate. The buoyant body may be formed of plastic (such as plastic injection in a mold) and have one or more cathedral type inner structures. The density of the buoyant body structure is substantially less than that of syntactic foam and other prior art buoyant body structures and compensates for the increased weight of a thick flat bottom plate. The bottom plate is metal and provides increased coupling to the seabed for seismic recording. The heavy bottom plate also provides a low center of gravity for the ocean bottom seismic node. The arrangement of electronic components within the ocean bottom seismic node (as well as repair, maintenance, and access) is simplified because various electronic components may be directly attached to the bottom metal plate and simply covered/protected by the buoyant body. The edge of the buoyant body may seal around the metal plate on one or more peripheral edges of the plate and buoyant body. The buoyant body and/or flat bottom plate design may be used for any type of ocean bottom seismic node, whether it is an autonomous underwater vehicle (AUV) or a more traditional ocean bottom seismic node that is placed on the seabed by an ROV or by rope/cable.

Disclosed is an ocean bottom seismic node with a cathedral inner structure. The node may comprise a buoyant body, a bottom plate coupled to the buoyant body, and a plurality of electronic components coupled to the bottom plate. The cathedral structure may be formed by or located within the buoyant body. The cathedral inner structure may comprise a plurality of internal chambers separated by a plurality of protrusions, which may be pillars or columns. Each chamber may be substantially elongated and have an arched ceiling or roof (similar to a cathedral ceiling), and thus may be considered an elongated arched chamber. In one embodiment, the buoyant body may comprise an exterior body portion and an interior body portion, wherein the exterior body portion comprises a first plurality of chambers and the interior body portion comprises a second plurality of chambers. The node may be any type of seismic node for ocean bottom recording, and may include an autonomous underwater vehicle (AUV) or a standalone seismic node that is placed on the ocean bottom by an ROV or by a cable/rope.

In one embodiment, the buoyant body may be formed of a hard material, such as plastic injection material, that may resist water and pressure at seabed depths. The structure for the buoyant body may be formed with a mold. The AUV may comprise a volume of air within the buoyant body. In one embodiment, the material of the buoyant body is negatively buoyant, but the body is overall positively buoyant based on the volume of air trapped within the cavities of the buoyant body when the body is sealed to the bottom metal plate. In one embodiment, one or more peripheral edges of the bottom plate is sealingly coupled to one or more peripheral edges of the buoyant body. The buoyant body may be removably coupled to the bottom plate. The bottom plate may be substantially flat and substantially metal.

In one embodiment, the plurality of electronic components is directly coupled to the metal plate. The plurality of electronics components may be located within the cathedral inner structure, such as in one or more of the cavities or chambers formed within the buoyant body. The plurality of electronics may comprise a first plurality of electronic components coupled to the bottom plate and a second plurality of electronic components vertically stacked on top of one or more of the first plurality of electronic components. The plurality of electronic components may comprise one or more seismic sensors, a clock, and a digital autonomous recorder (DAR). The plurality of electronic components may comprise a plurality of geophones directly coupled to the bottom plate.

Also disclosed is an ocean bottom seismic node with a buoyant body that includes a plurality of internal portions that form one or more cathedral structures. In one embodiment, the seismic node comprises an exterior body portion forming a first plurality of cathedral chambers, an interior body portion forming a second plurality of cathedral chambers, a bottom plate coupled to the interior body portion, and a plurality of electronic components coupled to the bottom plate and located within the second plurality of chambers. The bottom plate may be substantially flat and metal. In one embodiment, the second plurality of chambers may be located substantially within the first plurality of chambers. In one embodiment, the second plurality of chambers may be substantially dry, and the first plurality of chambers may be configured to act as a ballast. In one embodiment, one or more of the first plurality of chambers is at least partially filled with open celled foam.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Figure 1:
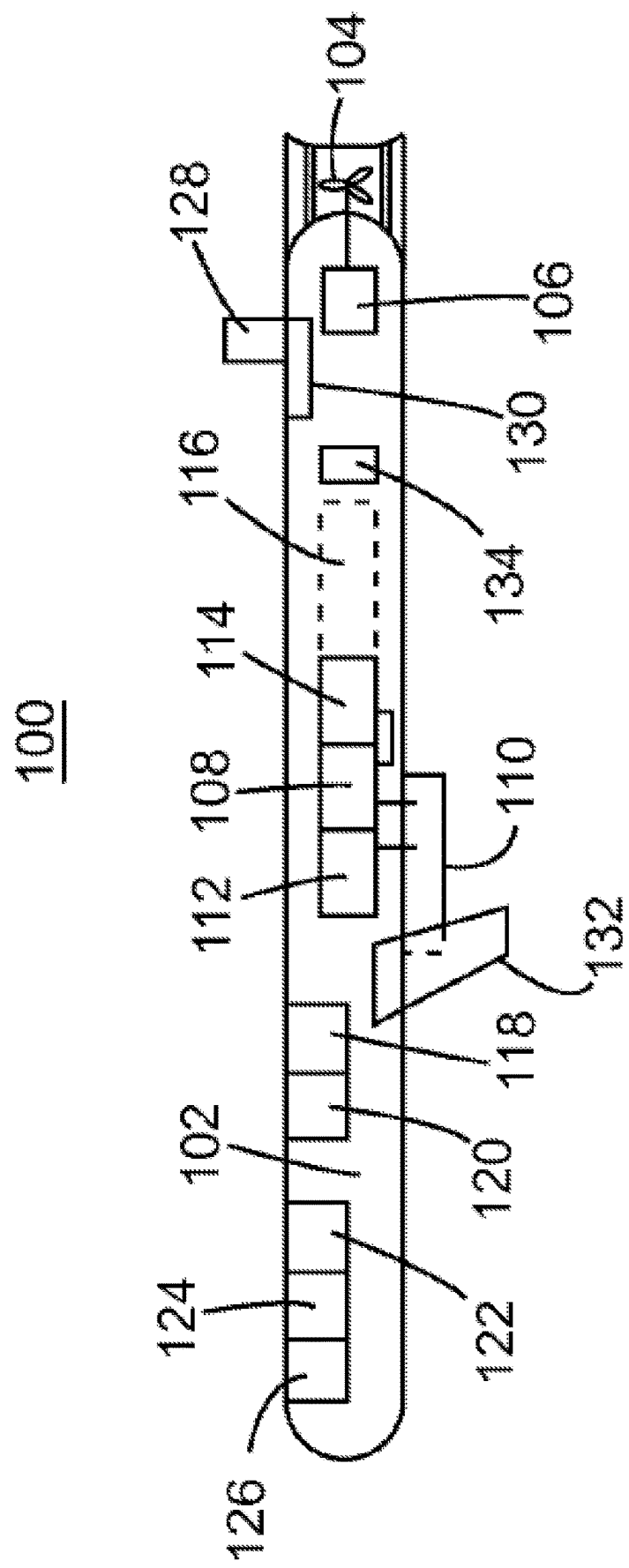
FIG. 1 illustrates one embodiment of a schematic diagram of an AUV.

Various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure. The following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

The disclosed application provides a novel buoyant body design for ocean bottom seismic nodes. The buoyant body may have one more or cathedral inner structures and may be directly coupled to a substantially flat bottom plate. Other components of the ocean bottom seismic node may be well known to those of skill in the art, such as that more fully described in U.S. Pat. Nos. 9,090,319 and 9,778,386, and U.S. Patent Publication Nos. 2017/0137098 and 2018/0222560, each incorporated herein by reference. While one embodiment of the ocean bottom seismic node is an autonomous underwater vehicle (AUV), other ocean bottom seismic nodes (such as independent seismometers placed on the seabed by a rope/cable or ROV) may similarly use the disclosed buoyant body/metal plate design described herein. The present disclosure will first describe the overall components of a seismic AUV (see FIG. 1) followed by one embodiment of an overall shape/configuration of an AUV that may use the disclosed buoyant body (see FIG. 2). The present disclosure will then discuss specific embodiments of the disclosed buoyant body and bottom metal plate generally consistent with a seismic AUV as described in FIGS. 1 and 2.

Autonomous Underwater Vehicles and Components Thereof

In one or more embodiments, the disclosed ocean bottom seismic node may be an autonomous underwater vehicle (AUV) that is used to record seismic signals on or near the seabed. A seismic AUV in the following description is considered to encompass an autonomous self-propelled underwater node that has one or more sensors capable of detecting seismic waves in a marine environment. The following embodiments are discussed, for simplicity, with regard to the terminology and structure of an AUV with seismic sensors for recording seismic waves. In general, the structure and operation of a seismic AUV is well known to those of ordinary skill. For example, Applicant's U.S. Pat. No. 9,090,319, incorporated herein by reference, discloses one type of autonomous underwater vehicle for marine seismic surveys.

Figure 5:
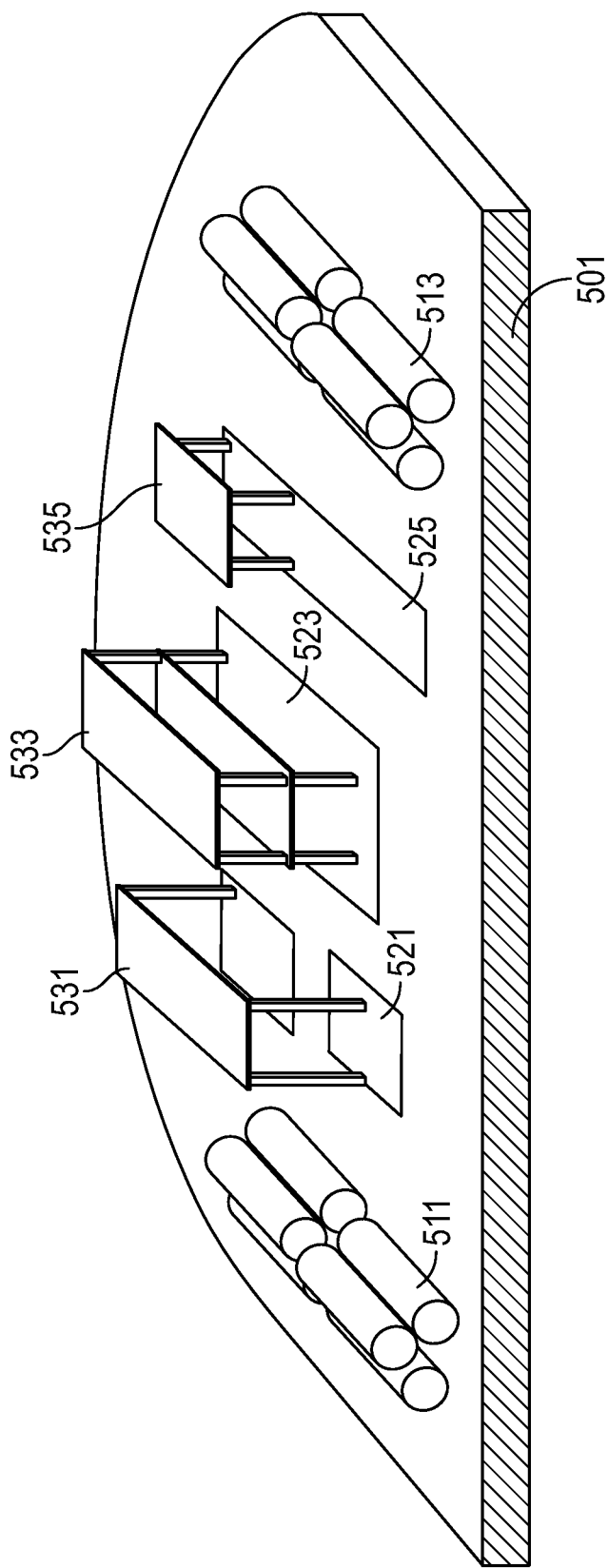
FIG. 5 illustrates one arrangement of a plurality of electronic components coupled to a flat bottom plate according to one embodiment of an ocean bottom seismic node of the present disclosure.

FIG. 1 is reproduced from FIG. 5 of Applicant's U.S. Pat. No. 9,090,319. The disclosed embodiment may use one or more systems, components, and/or features from the AUV described in FIG. 1. FIG. 1 illustrates one embodiment of AUV 100 having a body 102 in which a propulsion system may be located. The propulsion system may include one or more propellers 104 and a motor 106 for activating the propeller 104. Other propulsion systems may be used, such as jets, thrusters, pumps, etc. Further, the propellers (or other propulsion systems) may be located at various sections of the AUV, such as front, sides, or the top or bottom of the AUV, such as that disclosed in U.S. Patent Publication No. 2017/0137098, incorporated herein by reference. Alternatively, the propulsion system may include fins or wings 132 for controlling a trajectory of the AUV. Stabilizing fins and/or wings 132 for guiding the AUV to the desired position may be used with the propulsion system for steering and/or gliding of the AUV. The wings may be fixed or retractable or adjustable. However, in one embodiment, the AUV has no fins or wings.

Motor 106 may be controlled by a processor/controller 108. Processor 108 may also be connected to one or more seismic sensors 110. Seismic sensor 110 may have a configuration such that when the AUV lands on the seabed, the seismic sensor achieves a good coupling with the seabed sediment. The seismic sensor may include one or more of a hydrophone, geophone, accelerometer, etc. For example, if a 4 C (four component) survey is desired, the seismic sensors may include three geophones and a hydrophone, i.e., a total of four sensors. Alternatively, the seismic sensor may additionally include one or more accelerometers. Of course, other sensor combinations are possible, and may include one or more of a hydrophone, geophone, accelerometer, electromagnetic sensor, depth sensor, MEMs, or a combination thereof. Seismic sensor 110 may be located completely or partially inside body 102, while in some embodiments it may be located outside body 102 when better water coupling/exposure is needed (e.g., for hydrophones). A memory unit 112 may be connected to processor 108 and/or seismic sensor 110 for storing seismic data recorded by seismic sensor 110. Power system 114 (such as one or more batteries) may be used to power all these components. Battery 114 may be allowed to shift its position along a track 116 to change the AUV's center of gravity. This shift may be controlled by processor 108. The AUV may also include a clock and digital data recorder (not shown).

In one embodiment, the AUV may also include an inertial navigation system (INS) 118 configured to guide the AUV within a body of water and to a desired location. An inertial navigation system may include a module containing accelerometers, gyroscopes, magnetometers, or other motion-sensing devices. The INS may initially be provided with the current position and velocity of the AUV from another source, for example, a human operator, a GPS satellite receiver, a deployed subsea station, a deployed ROV, another AUV, from one or more surface vessels, etc., and thereafter, the INS computes its own updated position and velocity by integrating (and optionally filtering) information received from its motion sensors. One advantage of an INS is that it requires no external references in order to determine its position, orientation or velocity once it has been initialized. However, the INS may still require regular or periodic updates from an external reference to update the AUV's position to decrease the positioning error of the AUV, particularly after long periods of time subsea. As noted above, alternative systems may be used, as, for example, acoustic positioning. An optional acoustic Doppler Velocity Log (DVL) (not shown) can also be employed as part of the AUV, which provides bottom-tracking capabilities for the AUV. Sound waves bouncing off the seabed can be used to determine the velocity vector of the AUV, and combined with a position fix, compass heading, and data from various sensors on the AUV, the position of the AUV can be determined. This assists in the navigation of the AUV, provides confirmation of its position relative to the seabed, and increases the accuracy of the AUV position in the body of water. In other embodiments, and to reduce the complexity of the AUV, an INS may not be utilized.

Besides or instead of INS 118, the AUV may include compass 120 and other sensors 122 as, for example, an altimeter for measuring its altitude, a pressure gauge, an interrogator module, etc. The AUV 100 may optionally include an obstacle avoidance system 124 and a communication device 126 (e.g., Wi-Fi or other wireless interface, such as a device that uses an acoustic link) or other data transfer device capable of wirelessly transferring seismic data and/or control status data. One or more of these elements may be linked to processor 108. The AUV further includes antenna 128 (which may be flush with or protrude from the AUV's body) and corresponding acoustic system 130 for subsea communications, such as communicating with a deployed ROV (or other underwater station), another AUV, or a surface vessel or station. For surface communications (e.g., while the AUV is on a ship), one or more of antenna 128 and communication device 126 may be used to transfer data to and from the AUV. The AUV may include buoyancy system 134 for controlling the AUV's depth and keeping the AUV steady after landing.

Acoustic system 130 may be an Ultra-Short Baseline (USBL) system, also sometimes known as Super Short Base Line (SSBL). This system uses a method of underwater acoustic positioning. A complete USBL system may include a transceiver or acoustic positioning system mounted on a pole under a vessel or ROV (such as Hi-PAP or µPAP, commercially available by Kongsberg) and a transponder on the AUV. In general, a hydro-acoustic positioning system consists of both a transmitter and a receiver, and any Hi-PAP or µPAP or transponder system acts as both a transmitter and a receiver. An acoustic positioning system uses any combination of communications principles for measurements and calculations, such as SSBL. In one embodiment, the acoustic positioning system transceiver comprises a spherical transducer with hundreds of individual transducer elements. A signal (pulse) is sent from the transducer (such as a Hi-PAP or µPAP head on the surface vessel), and is aimed towards the seabed transponder located on the AUV. This pulse activates the transponder on the AUV, which responds to the vessel transducer after a short time delay. The transducer detects this return pulse and, with corresponding electronics, calculates an accurate position of the transponder (AUV) relative to the vessel based on the ranges and bearing measured by the transceiver. In one embodiment, to calculate a subsea position, the USBL system measures the horizontal and vertical angles together with the range to the transponder (located in the AUV) to calculate a 3D position projection of the AUV relative to a separate station, basket, ROV, or vessel. An error in the angle measurement causes the position error to be a function of the range to the transponder, so an USBL system has an accuracy error increasing with the range. Alternatively, a Short Base Line (SBL) system, an inverted short baseline (iSBL) system, or an inverted USBL (iUSBL) system may be used, the technology of which is known in the art. For example, in an iUSBL system, the transceiver is mounted on or inside the AUV while the transponder/responder is mounted on a separate vessel/station and the AUV has knowledge of its individual position rather than relying on such position from a surface vessel (as is the case in a typical USBL system). In another embodiment, a long baseline (LBL) acoustic positioning system may be used. In a LBL system, reference beacons or transponders are mounted on the seabed around a perimeter of a work site as reference points for navigation. The LBL system may use an USBL system to obtain precise locations of these seabed reference points. Thus, in one embodiment, the reference beacon may comprise both an USBL transponder and a LBL transceiver. The LBL system results in very high positioning accuracy and position stability that is independent of water depth, and each AUV can have its position further determined by the LBL system. The acoustic positioning system may also use an acoustic protocol that utilizes wideband Direct Sequence Spread Spectrum (DSSS) signals. In one embodiment, the AUV is equipped with a plurality of communication devices, such as an USBL beacon capable of receiving and transmitting acoustic signals, a phased array receiver (or system) that is able to determine the direction of an incoming acoustic signal by analysis of the signal phase, and an acoustic modem.

With regard to the AUV's internal configuration, the AUV includes a CPU that may be connected to an inertial navigation system (INS) (or compass or altitude sensor and acoustic transmitter for receiving acoustic guidance from the mother vessel), a wireless interface, a pressure gauge, and an acoustic transponder. The INS is advantageous when the AUV's trajectory has been changed, for example, because of an encounter with an unexpected object (e.g., fish, debris, etc.), because the INS is capable of taking the AUV to the desired final position as it encounters currents, wave motion, etc. Also, the INS may have high precision. For example, an INS may be accurate up to 0.1% of the travelled distance, and a USBL system may be accurate up to 0.06% of the slant range. Thus, it is expected that for a target having a depth of 1000 m, the INS and/or the acoustic guidance is capable of steering the AUV within +/−1 m of the desired target location. The INS may be also configured to receive data from a surface vessel and/or a deployed ROV to increase its accuracy. The AUV may include multiple CPUs. For example, a second CPU may be configured to control one or more attitude actuators and a propulsion system. One or more batteries may be located in the AUV. A seismic payload is located inside the AUV for recording the seismic signals. As another embodiment, an obstacle avoidance system may be included in the AUV, which is generally configured to detect an object in the path of the AUV and divert the AUV from its original route to avoid contact with the object. In one example, the obstacle avoidance system includes a forward-looking sonar. The AUV includes any necessary control circuitry and software for associated components. In one embodiment, the AUV may have various operational modes, such as wakeup, sleep, maintenance, and travel modes.

Those skilled in the art would appreciate that more or less modules may be added to or removed from the AUV. Further, as described in more detail below, the AUV schematically illustrated in FIG. 1 may comprise a cathedral buoyant body attached to a substantially flat metal plate.

AUV Design

The disclosed AUV embodiments provides numerous benefits over previously disclosed seismic AUVs, including better seabed seismic coupling, enhanced subsea maneuverability, control, and propulsion, and increased acoustic capabilities. The disclosed AUV uses less power than conventional seismic AUVs, and is also more cost effective, lighter, less complex, more reliable, and easier to handle and repair than existing seismic AUVs. The AUV may be configured to travel to at least 3000 meters beneath the surface of a body of water and record seismic signals at the bottom of the seabed with one or more seismic sensors.

Figure 2:
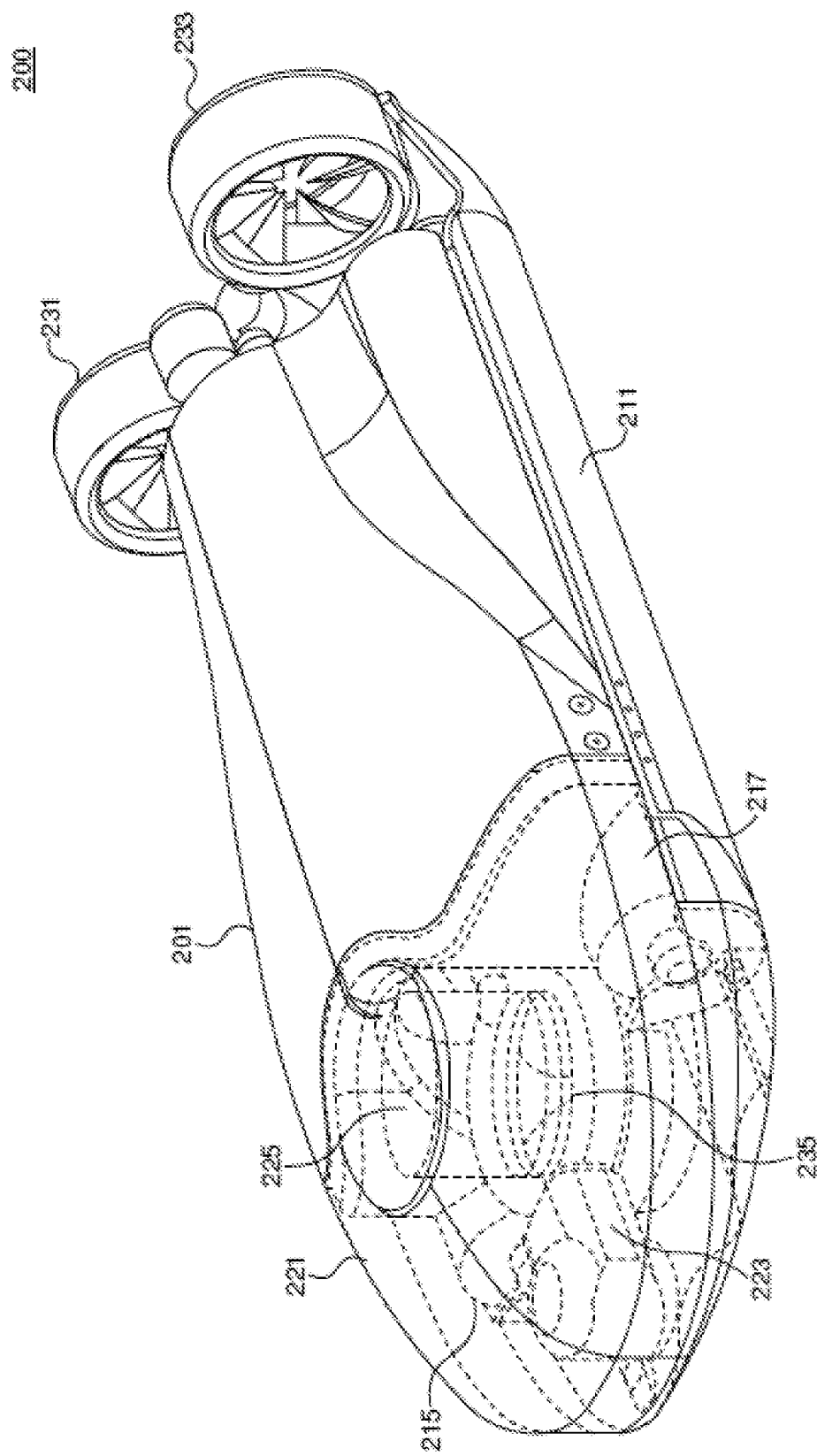
FIG. 2 illustrates a perspective view of a seismic AUV according to one embodiment of the present disclosure.

FIG. 2 illustrates a perspective view of a seismic AUV according to one embodiment of the present disclosure. In particular, the AUV embodiment illustrated in FIG. 2 may use the disclosed buoyant cathedral structure as the buoyant body for the AUV. A substantially flat bottom plate may or may not be utilized within the FIG. 2 embodiment.

In one embodiment, AUV 200 comprises a plurality of internal components surrounded by a plurality of modular casings that couple together to form the body of the AUV. In other words, once assembled, the individual casings or shells form an external body to provide the overall shape of the AUV. For example, as shown in FIG. 2, the disclosed AUV comprises buoyant body 201, lower shell or casing 211, head casing/cover 221, one or more pressure housings or electronic components within the buoyant body, and a propulsion system.

Buoyant body 201 may be designed to ensure proper hydrodynamics of the AUV in a body of water and the required buoyancy of the AUV. In one embodiment, the buoyant body forms an upper shell of the AUV that removably couples to head casing 221, and lower shell 211 (which may be a substantially flat bottom metal plate). In one embodiment, body 201 is comprised of a positively buoyant flotation material that partially offsets the remaining negative buoyant components of the AUV, thereby making the overall buoyancy of the AUV slightly negative. In other words, while the AUV buoyant body is positively buoyant, the remaining components (e.g., the electronic components, pressure vessels, wings, and other attached components) may be negatively buoyant such that the overall buoyancy of the AUV is slightly negative. In one embodiment, the overall vehicle weight is approximately 5 kg in sea water. In contrast, conventional AUVs have a substantially neutral water buoyancy, which makes coupling to the seabed potentially problematic for prior art seismic AUVs.

In one embodiment, the overall AUV shape is designed to provide lift during the motion of the AUV itself in a body of water. Much like an airplane, the lift force depends on the AUV velocity, the attack angle of the AUV, and the hydrodynamic shape of the AUV. In one embodiment, the bottom of the AUV (such as lower casing/plate 211) is substantially flat. In one embodiment, lower casing 211 is made of a plastic or similar PE type material, while in other embodiments it is made of a metal or metallic alloy.

In one embodiment, the AUV comprises avionics, a seismic payload, a power supply system, and a propulsion system. The AUV may comprise a plurality of electronic components, such as memory units, microprocessors, control systems, sensors, and batteries. In one embodiment, these electronic components and other seismic components may be located within one or more pressure housings or vessels of the AUV. These pressure housings may be located internal or external to the buoyant body. In other embodiments, the electronic components may simply be enclosed within the buoyant body, which may be water tight and pressure resistant at water depths found at the seabed. In one embodiment, the AUV may comprise a plurality of pressure housings or battery packs 215, 217 on either side of the AUV within the buoyant body. Each pressure housing or battery pack may be may be substantially in the shape of a cylinder.

The AUV may have a portion of the external casing located at the head, such as head casing 221. Head casing 221 may be located at the substantially front end of the AUV and be coupled to buoyant body 201 and/or lower case 211. In one embodiment, head casing 221 may hold or enclose one or more acoustic devices 223, such as a hydrophone or transducer or phased array receiver, etc., and thus may be considered an acoustic head casing. In one embodiment, acoustic device 223 may comprise a phase array head and/or transducer.

The AUV has a propulsion system that is configured to propel and/or steer the AUV in a body of water. The propulsion system may comprise a plurality of thrusters at different portions of the AUV. For example, the propulsion system may comprise one or more thrusters, such as one or more vertical thrusters 235 located towards a front portion of the AUV and one or more horizontal thrusters 231, 233 located near the rear portion of the AUV. More or less thrusters are possible. The thrusters may be integrated within various portions of the body or coupled to an external portion of the AUV body. For example, rear thrusters 231, 233 may be located external to body 201, and vertical thruster 235 may be located within head casing 221 or body 201. In one embodiment, head casing 221 comprises hole or opening 225 in which thruster 235 may be positioned. In other embodiments, the buoyant body itself comprises hole 225.

Figure 3A:
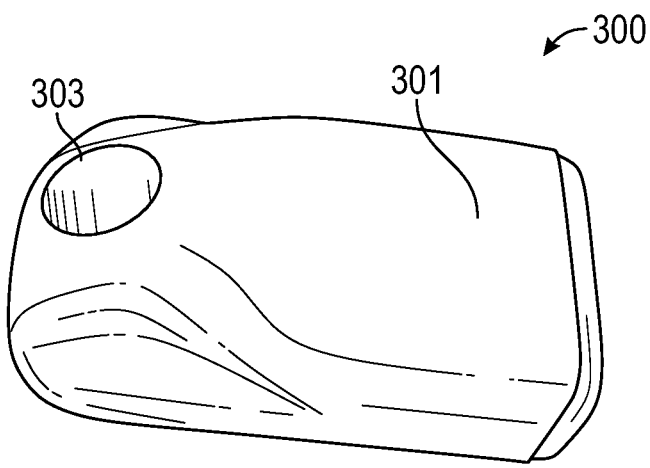
FIGS. 3A-3C illustrate various views of a buoyant body of an ocean bottom seismic node according to one embodiment of the present disclosure.
Figure 3B:
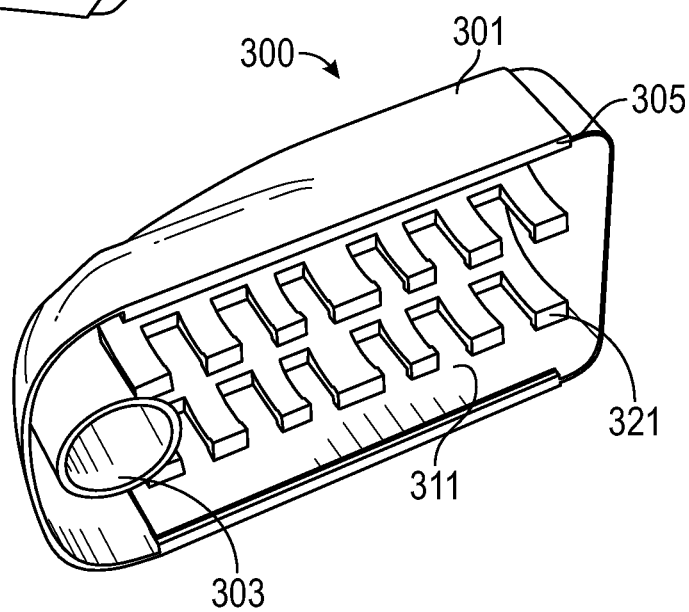
Figure 3C:
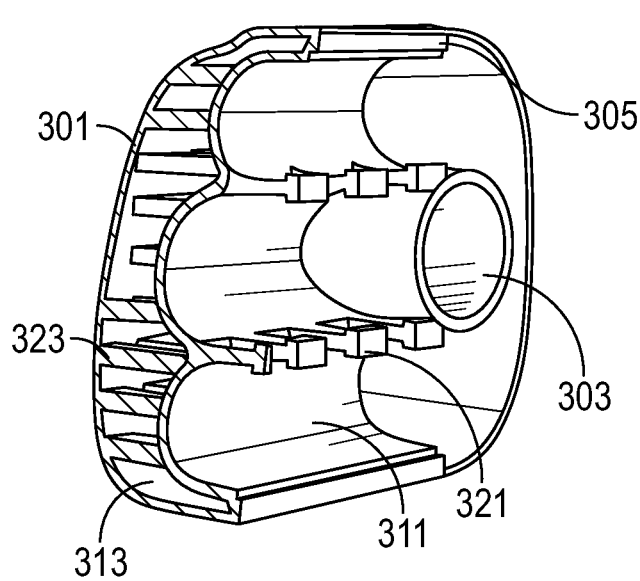

FIGS. 3A-3C illustrate various views of a cathedral buoyant body of an ocean bottom seismic node according to one embodiment of the present disclosure. FIG. 3A illustrates a top perspective view of a buoyant body, FIG. 3B illustrates a bottom perspective view of the buoyant body, and FIG. 3C illustrates a rear bottom perspective of the buoyant body with a partial cross section of an exterior portion of the buoyant body shell.

Buoyant body 300 may comprise a positively buoyant flotation material. In other embodiments, it may be formed of a material that is negatively buoyant (such as hard plastic) but based on the overall shape of the body (and the volume of air sealed/enclosed within the body), the body overall is positively buoyant when sealed with a separate structure (such as a metal plate). In one embodiment, and as illustrated in FIGS. 3B and 3C, the buoyant body may comprise a cathedral type inner structure. In this embodiment, the buoyant body may have an exterior shape 301 that is substantially solid but may have a substantially hollow or empty interior.

In one embodiment, the cathedral structure of the buoyant body is formed by a plurality of protrusions, columns, or pillars 321 that protrude inwardly from an exterior portion of the body (e.g., from an upper portion of the buoyant body to the bottom plate) and together which form a plurality of chambers or cavities 311. The protrusions also provide rigidity and/or strength to the overall buoyant body. In one embodiment, a plurality of columns 321 form a plurality of interconnected cavities 311 within the body. Each chamber 311 may be substantially elongated and have an arched upper surface, and thus may be considered an elongated arched chamber. In other words, as envisioned herein, a cathedral structure comprises one or more arched chambers/cavities. These chambers may be used to trap air within the body and/or to hold a plurality of electronic components (see FIG. 5). Columns 321 may each be substantially the same shape or may have different shapes between different portions of the cathedral structure. In some embodiments, a lower portion of columns 321 may be rectangular or circular shaped, and may comprise a flanged or enlarged portion as relative to the rest of the column. Some of the columns may touch the bottom plate (see FIG. 4A) when in an assembled position. Cavities 311 may be any number of shapes. In one embodiment, buoyant body comprises approximately three substantially cylindrical chambers 311 (see FIG. 3C), and in one embodiment each chamber is interconnected with the other chambers by spaces or openings between columns 321. The configuration, size, and ratio of interior columns 321 to interior cavities 311 will vary based on the intended density of the overall buoyant body and AUV, the particular material used to form the buoyant body, and the overall shape of the buoyant body. In one embodiment, the volume of air inside of the buoyant body (when sealed against a bottom plate) is sufficient to compensate for the size and weight of the bottom plate and to avoid using syntactic foam and other prior art air pocket structures.

Referring to FIG. 3C, exterior portion 301 of the buoyant body may comprise a plurality of exterior columns 323 that form a plurality of exterior chambers/cavities 313 that help form the exterior wall for the buoyant body. Exterior columns 323 provide increase rigidity and strength to the overall buoyant body. The configuration, size, and ratio of exterior columns 323 to exterior cavities 313 will vary based on the intended density of the overall buoyant body and AUV, the particular material used to form the buoyant body, and the overall shape of the buoyant body. Likewise, the width or thickness of the exterior body portion 301 may be varied based on the desired rigidity of the body. In other embodiments, such as that disclosed in FIGS. 4A and 4B, the exterior portion 301 of the buoyant body may be substantially solid and may not include any exterior columns or cavities.

The type of cathedral style inner structure illustrated in buoyant body 300 is easy to mold by plastic injection and is much more cost effective than previous buoyant bodies (which may be formed of syntactic foam). For example, the buoyant body may be cast in a pre-made polyethylene (PE) coated or similar plastic coating mold. In one embodiment, buoyant body 300 is cast as a single structure, and all of the protrusions and/or columns of the buoyant body are integrally formed with an exterior shape 301 of the body. The plastic forming the buoyant body may be a wide range of densities and is formulated to meet depth and buoyancy requirements down to 10,000 meters. In one embodiment, the buoyant body is pressure and water resistant on the ocean bottom at a depth of at least 3000 meters. Among other benefits, the buoyant body has high compressive strength, high buoyancy per kilogram, and low water absorption. In contrast, conventional buoyant bodies (such as those made from syntactic foam) are expensive to manufacture, are not resistant to high pressures, are not resistant to water, and are generally prone to breaking and deformation. In one embodiment, the manufacturing cost of the buoyant body is significantly less than the manufacturing cost of a similarly shaped syntactic foam body existing in the prior art.

The buoyant body of the disclosed seismic node may be fully casted to the specific configurations of the AUV body shape and thereafter coated with one or more layers of protective skins for improved impact resistance, reduced water absorption, and reduced drag in the water. The protective coating may also have anti-fouling properties to prevent or slow down any undesired marine biological growth. Various other embodiments of the buoyant body are possible.

The buoyant body may have one or more openings 303 (see FIGS. 3B and 3C) molded into the overall shape of the body to receive an external component of the AUV, such as a thruster. For example, depending on the overall configuration and shape of the AUV, a vertical thruster (such as vertical thruster 235) may be situated within the buoyant body within opening 303.

Figure 4A:
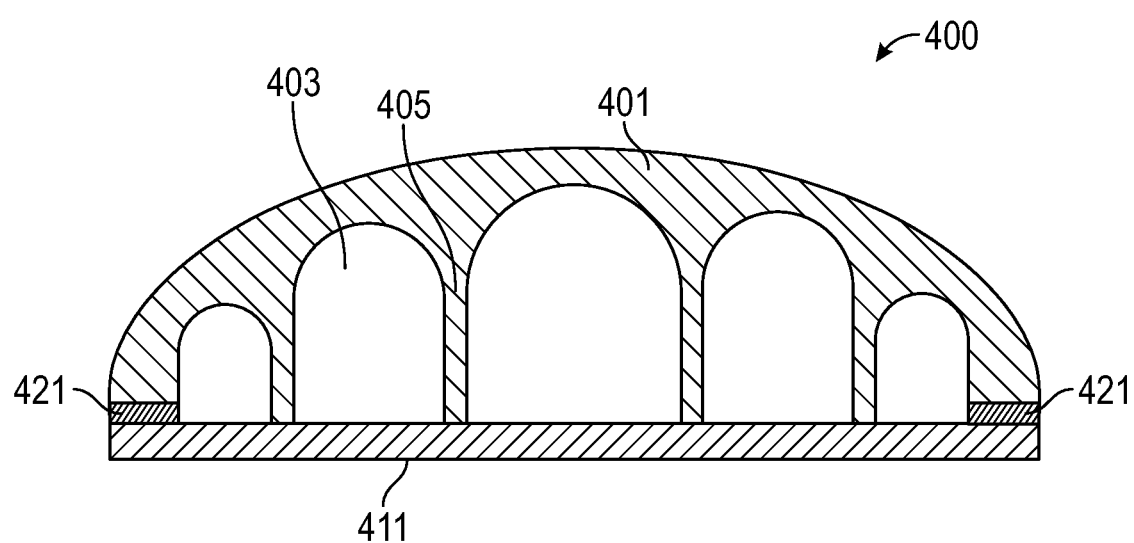
FIGS. 4A-4B illustrate a buoyant body coupled to a flat bottom plate according to one embodiment of an ocean bottom seismic node of the present disclosure.

In one embodiment, buoyant body 300 is configured to couple with a substantially flat bottom plate (see, e.g., FIG. 4A). In one embodiment, a bottom section of the buoyant body has a plurality of peripheral edges 305 that are configured to sealingly engage to a portion of the bottom plate. A separate sealing system or material may be coupled to portions of the buoyant body to better seal with the bottom plate. In other embodiments, portions of the buoyant body may slide within one or more grooves or recesses of a bottom plate (not shown) to better attach and/or seal the body to the plate.

In one embodiment, the coupling arrangement of the buoyant body to a bottom plate provides a single waterproof housing for the seismic node in which all or substantially all of the electronic components are situated and enclosed within the buoyant body. Such an arrangement facilitates maintenance and repair of any internal components and provides a much easier access point to the internal components of the seismic node as compared to existing seismic nodes. Further, the electrical coupling of different internal components is facilitated because separate pressure housings is not necessary. Further, because the exterior of the buoyant body is resistant to corrosion, none of the internal electronic components are exposed to sea water and watertight connections are not needed. Overall, the use of the disclosed material for the buoyant body and the simplification of pressure housings and arrangement of internal electronic components greatly reduces the overall cost of the disclosed ocean bottom seismic node.

Figure 4B:
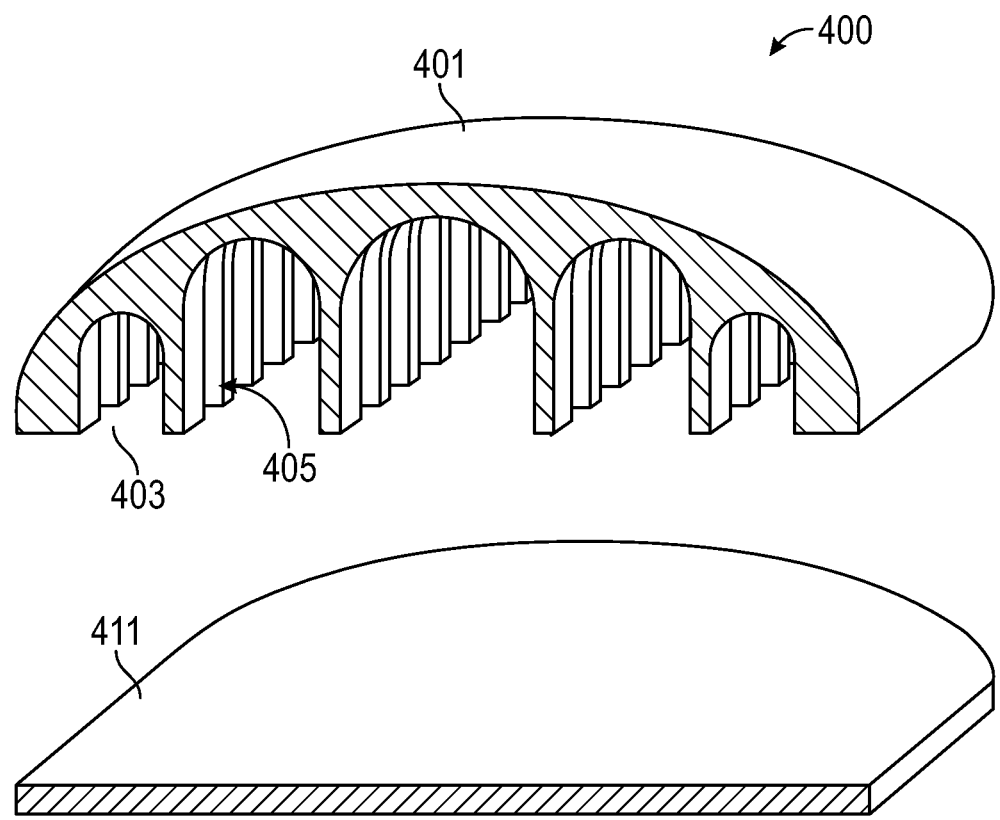

FIGS. 4A-4B provide one illustration of a buoyant body (such as buoyant body 300) coupled to a flat bottom plate according to one embodiment of an ocean bottom seismic node of the present disclosure. FIG. 4A shows a cross-section of the body and FIG. 4B shows a perspective view of the body in an exploded view from the plate. In one embodiment, buoyant body 400 comprises a rounded exterior shape 401 with a plurality of internal columns/protrusions 405 that form a plurality of internal chambers/cavities 403. The chambers may be interconnected or separated. For example, buoyant body comprises five substantially elongated arched cavities that are interconnected by spaces/openings between columns 405. Of course, more or less chambers may be utilized depending on the size of the node, the material of the body, and the operating pressure of the node. Buoyant body 400 is substantially similar to buoyant body 300 and similarly describes a cathedral type structure for the buoyant body. In one embodiment, the exterior portion/wall 401 of the buoyant body is substantially solid, whereas the exterior wall/portion 301 of buoyant body 300 comprises columns and chambers.

As described above, buoyant body 400 may be coupled to a bottom plate, such as thick bottom plate 411. The buoyant body may be removably coupled to the bottom plate for easy access to the electronic components within the cathedral structure(s) of the buoyant body. In one embodiment, the bottom portion of buoyant body 401 may have peripheral edges 421 that may be sealingly coupled to bottom plate 411. In some embodiments, the internal protrusions 405 of the buoyant body may also touch and/or couple to the bottom plate. In one embodiment, the cross section of the buoyant body may be substantially similar to that of the bottom plate, while in other embodiments the bottom plate may be bigger or smaller than the buoyant body. Bottom plate 411 may be metal (such as aluminum, titanium, etc.) and the thickness may be determined according to several criteria such as (i) mechanical resistance and acceptable deformation while on the sea floor and (ii) sufficient weight to counter buoyancy and offer adequate pressure on the sea floor. In one embodiment, the bottom plate is substantially larger than prior art bottom plates for ocean bottom seismic nodes (and in particular seismic AUVs) thereby providing a very good seismic coupling to the seabed and a low center of gravity. In one embodiment based on the thick bottom plate, the disclosed ocean bottom seismic node avoids any ground roll waves that are present near the seabed. In some embodiments, the plate may comprise ridges or other patterns on the bottom side of the bottom plate as is known in the art to facilitate movement of water during coupling with the seabed. Further, while in some embodiments the bottom plate is substantially flat, in other embodiments it may be slightly convex or curved to facilitate coupling to the seabed and/or movement through water.

FIG. 5 illustrates one arrangement of a plurality of electronic components on a flat bottom plate according to one embodiment of an ocean bottom seismic node of the present disclosure. Flat bottom plate 501 may be substantially similar to flat bottom plate 401 illustrated in FIGS. 4A and 4B. In one embodiment, flat bottom plate 501 is sized to couple with a buoyant body as disclosed herein.

In one embodiment, a plurality of electronic components may be directly coupled to bottom plate 501. For example, first battery pack system 511 may be coupled to a first portion of the plate and second battery pack system 513 may be coupled to a second, opposite portion of the plate. The battery packs may be contained within its individual battery housing or system, which may then be coupled to the bottom plate. Further, a plurality of electronic boards may be arranged and/or coupled to the bottom plate based on thermal dissipation issues and/or electromagnetic (EM) issues. For example, a first plurality of boards/components 521, 523, 525 may be directed coupled and/or otherwise attached to the bottom plate. These components may require important thermal dissipation and/or EM shielding (both of which are enhanced by direct coupling to metal plate 501). In one embodiment, a second plurality of electronic components 531, 533, 535 may be coupled to the first plurality of electronic components (such as by vertically stacking) when thermal dissipation issues are not as important. In one embodiment, multiple levels of vertical stacking for the electronic components may be utilized, as illustrated for electronic components 533 (showing two sets of vertically stacked components). Thus, the disclosed configuration/design of the electronic components and the metal plate reduces heat buildup within the AUV.

In one embodiment, and in direct contrast to the prior art, the electronic components illustrated in FIG. 5 are not enclosed within additional pressure resistant housings/vessels, as the overall buoyant body structure provides the overall pressure/water resistant structure for the enclosed electronic components. Such an electronic arrangement greatly simplifies installation, minimizes costs and weights of pressure housings, and reduces the complexity of wires/cabling between the different components. As another benefit, in one embodiment, certain sensors (such as geophones) may be directly attached (e.g., bolted) to the bottom plate, which greatly increases the accuracy and precision of such sensors and allows them to better seismically couple to the seabed. As another benefit, removal of the buoyant body allows access to all of the electronic components at once, thereby making repairs and maintenance much easier.

In some embodiments, it may still be necessary to include various electronic components at least partially exterior to the internal structure of the cathedral buoyant body. For example, hydrophones, acoustic modems, and thrusters may be at least partially located outside of the cathedral body. In one embodiment, cables and other electrical conduit from electronics in dry cavities of the buoyant body (e.g., cavities 311, 403, 623) are routed to various external devices (such as motors, actuators, thrusters, etc.) via one or more grooves or conduits in the bottom plate. Thus, all conduits from different chambers or cavities may be routed external to the metal plate or buoyant body via a single watertight connection (or at least minimized watertight connections) through the bottom plate.

Figure 6A:
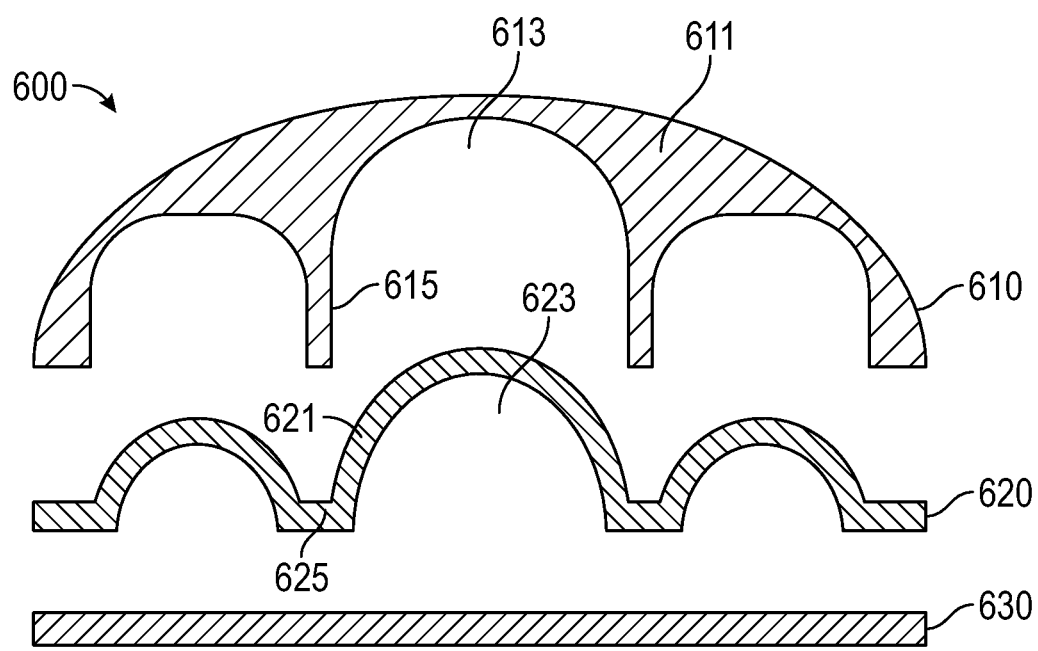
FIGS. 6A-6B illustrate various views of a buoyant body coupled to a flat bottom plate according to one embodiment of an ocean bottom seismic node of the present disclosure.
Figure 6B:
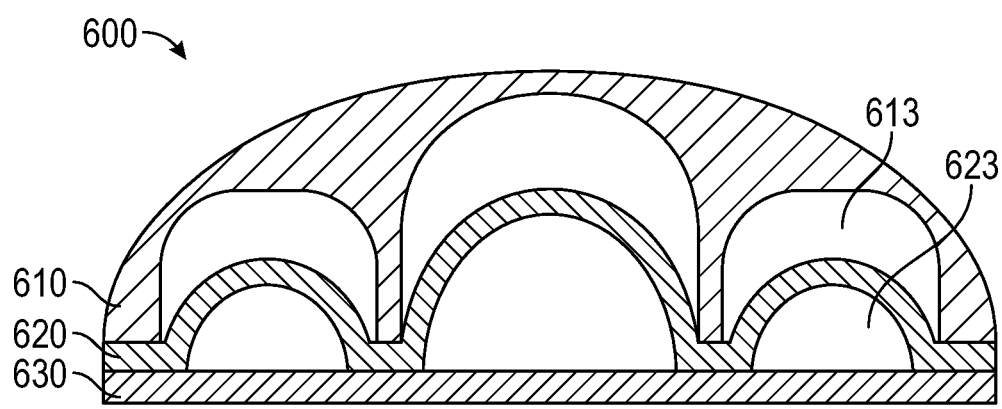

FIGS. 6A-6B provide one illustration of a buoyant body coupled to a flat bottom plate according to one embodiment of an ocean bottom seismic node of the present disclosure. In one embodiment, the buoyant body of FIGS. 6A and 6B is similar to the buoyant body of FIGS. 4A and 4B but includes an additional interior cathedral layer. In other words, the body of FIGS. 6A and 6B comprises two levels of cathedral type inner structures that form a buoyant structure for the seismic node body. FIG. 6A shows body 600 in an exploded format while FIG. 6B shows body 600 in an assembled format.

In one embodiment, body 600 comprises first body portion 610 and second body portion 620 that fits between first body portion 610 and bottom plate 630. First body portion 610 may be considered an exterior portion of the body and second body portion 620 may be considered an interior portion of the body. Both first and second body portions 610 and 620 may have one or more cathedral structures similar to those described in FIGS. 3C and 4A. In one embodiment, the cathedral structures of second body portion 620 fit within corresponding cathedral structures of first body portion 610. The materials of the first and second body portions may be the same or different. In one embodiment, first body portion 610 is formed of injected polycarbonate reinforced glass. In one embodiment, second body portion 620 is formed of thermo-compressed plastic reinforced fiberglass sheets. In other embodiments, both of the interior and exterior cathedral bodies are formed of the same material. In one embodiment, the bodies may be formed of glass fibers that have been impregnated with a plastic resin matrix. Composites with glass fibers and a resin matrix creates structures that are strong, lightweight, corrosion-resistant, and dimensionally stable. These composites offer excellent design flexibility. The manufacture of such composites is well known to those of skill in the art.

In one embodiment, exterior body 610 comprises a rounded exterior shape 611 with a plurality of internal columns/protrusions 615 that form a plurality of chambers/cavities 613. In one embodiment, exterior body 610 provides the overall form or shape of the seismic node and/or body. Cavities 613 may be interconnected or separated along a length of the body. Columns 615 also provide rigidity and/or strength to the overall buoyant body. The embodiment of FIGS. 6A and 6B show three chambers (and/or three rows of chambers), but more or less is possible. Body 610 may be substantially similar to buoyant body 300 and buoyant body 400 as described previously herein.

In one embodiment, interior cathedral body 620 comprises a plurality of rounded protrusions 621 connected by a series of flat segments 625 that together form a plurality of chambers/cavities 623. The disclosed structure of second body 620 also provide rigidity and/or strength to the overall buoyant body. In one embodiment, each of the rounded protrusions 621 is configured to fit within one of the cavities 613 of first body 610 Likewise, each of the columns 615 is configured to couple with a portion of a flat segment 625. In one embodiment, each flat segment 625 is configured to couple with a portion of bottom plate 630. In one embodiment, the peripheral edges of second body 620 is sealingly coupled to bottom plate 630, while in other embodiments each of the flat segments 625 of the second body is sealingly coupled to bottom plate 630. In one embodiment, the cross section of the buoyant body (whether first body 610 or second body 620) may be substantially similar to that of the bottom plate, while in other embodiments the bottom plate may be bigger or smaller than the exterior dimensions of the buoyant body. In one embodiment, bottom plate 630 may be substantially similar to bottom plate 411 as described above in relation to FIGS. 4A and 4B. In one embodiment, cavities 623 formed within the second body are dry and pressure and water resistant at ocean bottom depths, and any electronics for the seismic node may be placed within cavities 623 without separate pressure housings.

In an assembled format (see FIG. 6B), exterior body 610, interior body 620, and bottom plate 630 form a body that is positively buoyant. In one embodiment, while the interior and exterior body portions may be formed of a material that is negatively buoyant (such as hard plastic), based on the overall shape of the body (and the volume of air sealed/enclosed within the body), the body overall is positively buoyant when sealed against a separate structure (such as a bottom metal plate). In this embodiment, the buoyant body may have a generally exterior shape that has a substantially hollow or empty interior. One or more of the chambers/cavities of the body may be used to trap air within the body, trap fluid within the body, and/or to hold a plurality of electronic components (see FIG. 5). The configuration, size, and ratio of columns to chambers will vary based on the intended density of the overall buoyant body and AUV, the particular material used to form the buoyant body, and the overall shape of the buoyant body. In one embodiment, the volume of air inside of the buoyant body (when sealed against a bottom plate) is sufficient to compensate for the size and weight of the bottom plate and to avoid using syntactic foam and other prior art air pocket structures. In other embodiments, only one of the interior or exterior bodies may have an inner cathedral shape. In other embodiments, the number of cathedral cavities in the interior and exterior bodies may be different.

In one embodiment, cavities 613 formed in the first body may be configured as ballasts. Water may be allowed to enter and/or exit the cavities as desired to change the overall buoyancy of the body by using a system of valves and/or openings. In one embodiment, the ballast(s) (e.g., one or more of cavities 613) may be substantially filled with air (e.g., thereby having little to no water) on the ship surface and/or prior to being deployed in a body of water. Without the ballast(s) full of water, the AUV is significantly lighter and more maneuverable in the water and during travel to the seafloor. This is effectively opposite to conventional ballasting systems for seismic AUVs, which generally desire a heavy AUV with ballasts full of water to assist in vertical movement of the AUV towards the seabed. Once the AUV has landed air may be released from the cavities so that water enters into the cavities and makes the AUV heavier to provide better seismic coupling between the node and the seabed. During recovery of the seismic node, the AUV may travel to the surface (or another recovery destination) with the ballasts full of water or after water has been expelled from the ballasts as is known in the art, such as by the use of one or more valves and other piping systems disclosed in U.S. Patent Publication No. 2015/0336645, incorporated herein by reference.

In another embodiment, cavities 613 (e.g., the ballasts within the double cathedral structure AUV) may be partially and/or substantially filed with an open cell foam structure (much like a sponge) that can be filled with water. The amount of water may be variable based on the density of the foamed structure. One or more holes may be drilled into exterior cathedral structure 610 to allow water to enter cavities 613. In one embodiment, the water slowly enters the cavities and slowly fills the cells of the open cell foamed structure within cavities 613 during subsea travel. By the time the AUV reaches the sea bottom, the open cell foam structure is substantially filled with water to make the AUV heavier for seabed seismic coupling. By having the cavities filled with an open celled structure, the walls of the exterior body 610 may be designed thinner, as the foam contributes to the mechanical resistance of the overall AUV body and provides structural support. Thus, the overall costs may be less for the body and the overall AUV may be lighter on the deck surface without being full of water.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention.

Many other variations in the arrangement and make-up of the electronic and physical configuration of the disclosed ocean bottom seismic node is within the scope of the invention. For example, the ocean bottom seismic node may be an AUV or may simply be an independent seismometer that is configured to couple with the seabed by placement with an ROV or by coupling with a rope or cable. The cathedral buoyant body may or may not be coupled with a substantially flat bottom metal plate. The node may be overall neutrally buoyant, or may be negatively buoyant or positively buoyant. Electronic components of the node may be directly coupled to the bottom plate or simply enclosed within the buoyant body (e.g., within one or more inner cathedral chambers) or even within grooves or conduits within the bottom plate. Electronic components may or may not be contained within separate pressure housings within the inner chambers of the buoyant body. The buoyant body may be arranged to seal directly with the bottom plate or a separate sealing system may be used to seal the buoyant body to the bottom plate. The buoyant body may have just one inner cathedral structure or may have a plurality of inner cathedral structures, some of which may or may act as ballasts and/or be filled with open cell foam. It is emphasized that the foregoing embodiments are only examples of the very many different structural and material configurations that are possible within the scope of the present invention.

Although the invention(s) is/are described herein with reference to specific embodiments, various modifications and changes can be made without departing from the scope of the present invention(s), as presently set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. An ocean bottom seismic node for recording seismic signals on the ocean bottom, the node comprising:
    a buoyant body that comprises a cathedral inner structure;
    a bottom plate coupled to the buoyant body; and
    a plurality of electronic components coupled to the bottom plate,
    wherein the cathedral inner structure comprises a plurality of internal chambers separated by a plurality of columns.

2. The node of claim 1, wherein each of the plurality of internal chambers comprises an arched ceiling.

3. The node of claim 1, wherein the buoyant body comprises an exterior body portion, wherein the exterior body portion comprises a first plurality of chambers separate from the plurality of internal chambers.

4. The node of claim 1, wherein the buoyant body comprises a hard- plastic material.

5. The node of claim 1, wherein the material of the buoyant body is negatively buoyant, wherein the buoyant body is configured to be positively buoyant based on a volume of air sealed within the buoyant body.

6. The node of claim 1, wherein one or more peripheral edges of the bottom plate is sealingly coupled to one or more peripheral edges of the buoyant body.

7. The node of claim 1, wherein the bottom plate is substantially flat.

8. The node of claim 1, wherein the bottom plate is substantially metal.

9. The node of claim 1, wherein the plurality of electronic components is located within the cathedral inner structure.

10. The node of claim 1, wherein the plurality of electronics comprises a first plurality of electronic components coupled to the bottom plate and a second plurality of electronic components vertically stacked on top of at least one of the first plurality of electronic components.

11. The node of claim 1, wherein the plurality of electronic components comprises one or more seismic sensors, a clock, and a digital autonomous recorder (DAR).

12. The node of claim 1, wherein the plurality of electronic components comprises a plurality of geophones directly attached to the bottom plate.

13. The node of claim 1, wherein the node is an autonomous underwater vehicle (AUV) that comprises a propulsion system configured to propel and steer the AUV while travelling underwater.

14. An ocean bottom seismic node for recording seismic signals on the ocean bottom, the node comprising:
- an exterior body portion forming a first plurality of cathedral chambers;
- an interior body portion forming a second plurality of cathedral chambers, wherein the second plurality of chambers is substantially dry;
- a bottom plate coupled to the interior body portion; and
- a plurality of electronic components coupled to the bottom plate and located within the second plurality of chambers.

15. The node of claim 14, wherein the second plurality of chambers is located substantially within the first plurality of chambers.

16. The node of claim 14, wherein one or more of the first plurality of chambers is configured to act as a ballast.

17. The node of claim 14, wherein one or more of the first plurality of chambers is at least partially filled with open celled foam.

18. An ocean bottom seismic node for recording seismic signals on the ocean bottom, the node comprising:
- a buoyant body that comprises a cathedral inner structure;
- a bottom plate coupled to the buoyant body; and
- a plurality of electronic components coupled to the bottom plate,
- wherein the buoyant body comprises an exterior body portion and an interior body portion, wherein the exterior body portion comprises a first plurality of chambers and the interior body portion comprises a second plurality of chambers.

* * * * *